Dec. 26, 1944.  H. A. PERKINS  2,365,838
CANDY STICK MACHINE
Filed Aug. 22, 1941  9 Sheets-Sheet 1

INVENTOR.
Hiram A. Perkins
BY
R.W. Holbrook Attorney

Dec. 26, 1944.    H. A. PERKINS    2,365,838
CANDY STICK MACHINE
Filed Aug. 22, 1941    9 Sheets-Sheet 4

INVENTOR.
Hiram A. Perkins
BY
[signature] Attorney

Dec. 26, 1944.   H. A. PERKINS   2,365,838
CANDY STICK MACHINE
Filed Aug. 22, 1941   9 Sheets-Sheet 5

INVENTOR.
Hiram A. Perkins
BY
R M Holbrook   Attorney

Dec. 26, 1944.　　　H. A. PERKINS　　　2,365,838
CANDY STICK MACHINE
Filed Aug. 22, 1941　　　9 Sheets-Sheet 6

INVENTOR.
Hiram A. Perkins
BY
R. M. Holbrook Attorney

Dec. 26, 1944.  H. A. PERKINS  2,365,838
CANDY STICK MACHINE
Filed Aug. 22, 1941    9 Sheets-Sheet 7
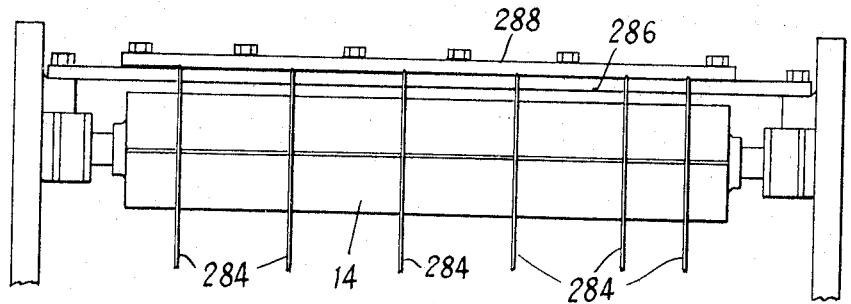
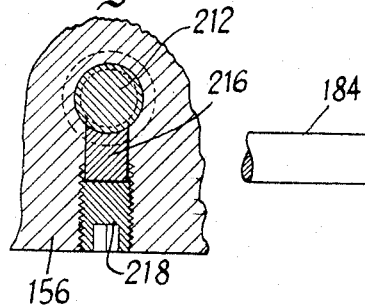
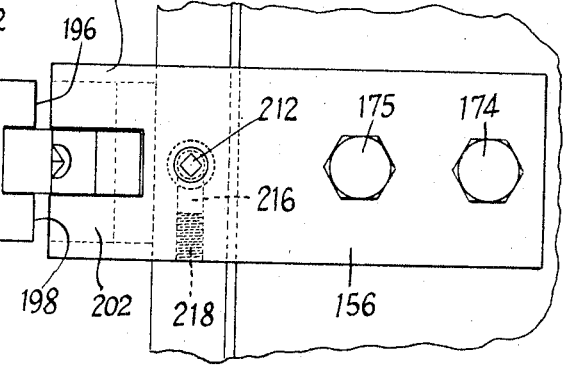
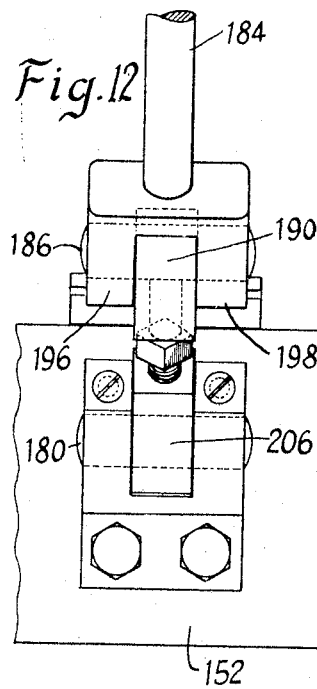
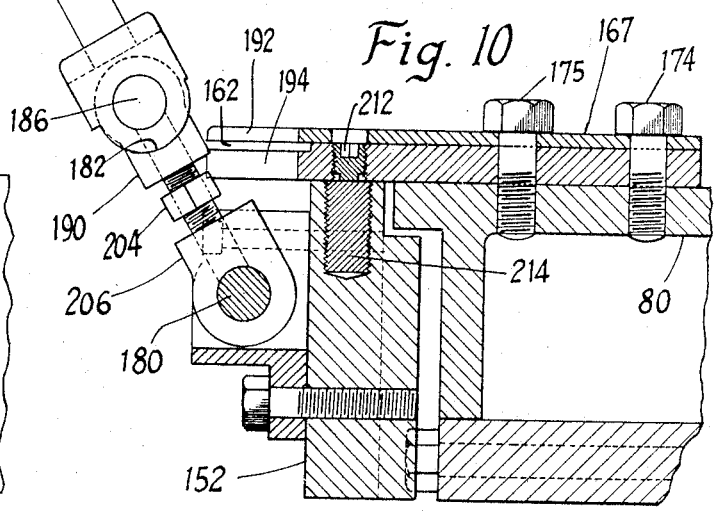
INVENTOR.
Hiram A. Perkins
BY
*R. W. Holbrook* Attorney Dec. 26, 1944. H. A. PERKINS 2,365,838
CANDY STICK MACHINE
Filed Aug. 22, 1941   9 Sheets-Sheet 8

INVENTOR.
Hiram A. Perkins
BY
R. W. Holbrook   ATTORNEY.

Dec. 26, 1944.         H. A. PERKINS         2,365,838
CANDY STICK MACHINE
Filed Aug. 22, 1941         9 Sheets-Sheet 9

INVENTOR.
Hiram A. Perkins
BY
Attorney

Patented Dec. 26, 1944

2,365,838

UNITED STATES PATENT OFFICE 2,365,838

CANDY STICK MACHINE

Hiram A. Perkins, Rochester, N. Y., assignor to Setter Bros. Inc., Cattaraugus, N. Y., a corporation of New York Application August 22, 1941, Serial No. 407,917

8 Claims. (Cl. 164—68)

This invention relates to improvements in a machine for making small diameter rods for use as candy holding sticks. The machine continuously receives paper from an unwinding supply roll, cuts the paper into strips, convolutes the strips into loosely wound rolls, and continues the convoluting of those rolls to compact them into substantially solid and permanently bonded rods.

A prime object of the present improvements is to reduce "outage," or to so improve the efficiency and operation of the machine that the periods of continuous operation are greatly increased. Thus production costs are decreased and the materials and labor costs occasioned by frequent jamming of the machine with unfinished rods is minimized.

To these ends this invention presents an improved strip cutter and a novel rod cutter.

The invention also involves an improved method and mechanism for drying the convoluted rods immediately upon their discharge from the rod cutter, the drying mechanism being such as to decrease the drying period and prevent the manufacture of warped rods due to uneven or insufficient drying action.

The invention will be described with reference to the accompanying drawings, other objects of the invention appearing as the description proceeds.

In the drawings:

Fig. 10 is a detail view of a part of the rod cutter supporting structure, presented as a partial transverse vertical section;

Fig. 11 is a top plant of the structure indicated in Fig. 10;

Fig. 12 is a front elevation of the structure shown in Fig. 10;

Fig. 13 is a horizontal section on the plane indicated by the line 13—13 of Fig. 10;

Fig. 14 is a view in the nature of a front elevation of the rear roller of the strip cutter, showing the associated upright guide rods from a position indicated by the line 14—14 of Fig. 4;

Figure 3:
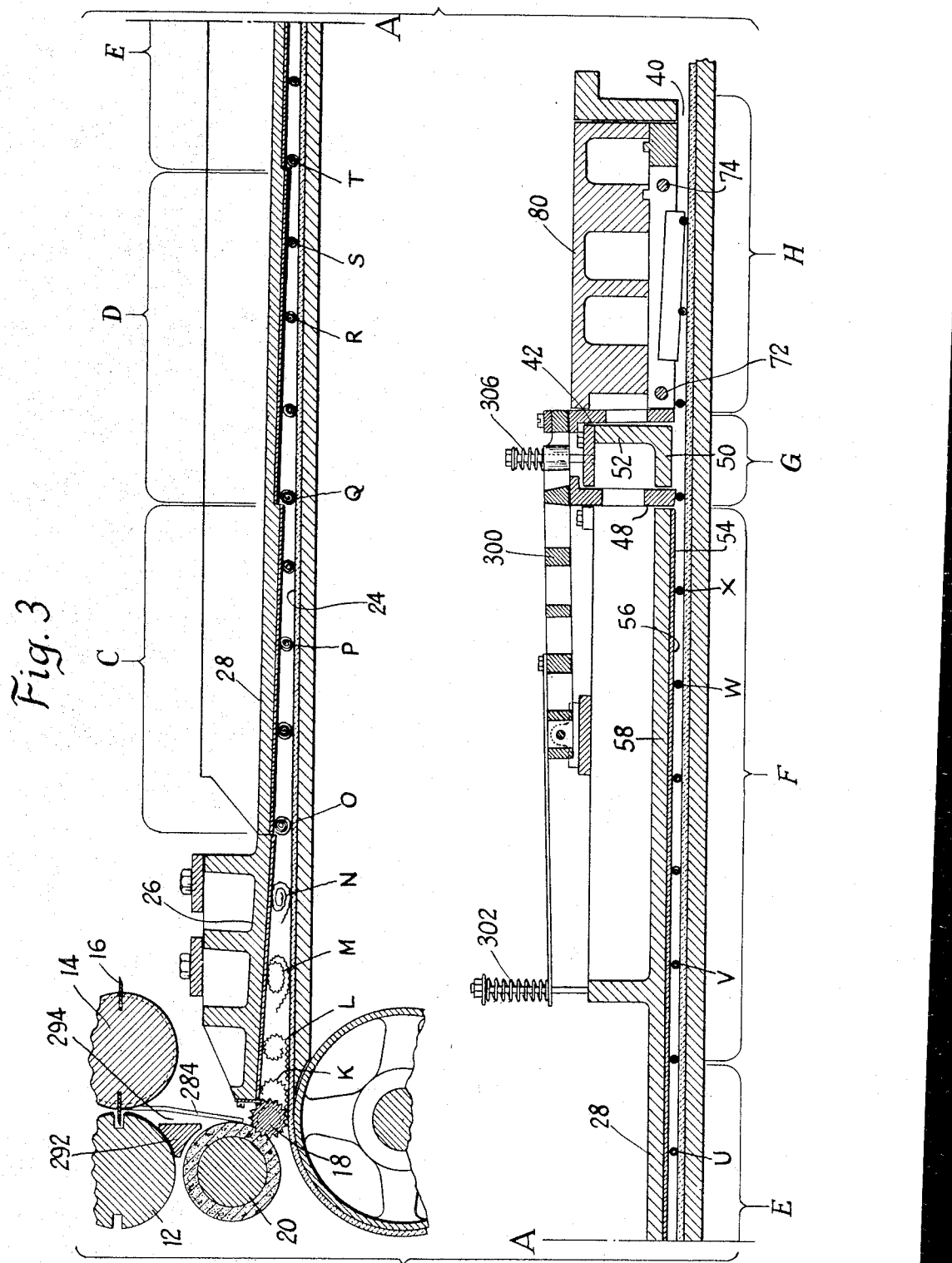
Fig. 3 is a view in the nature of a longitudinal vertical section illustrating the action of the machine in forming rods of convoluted paper strips.
Figure 4:
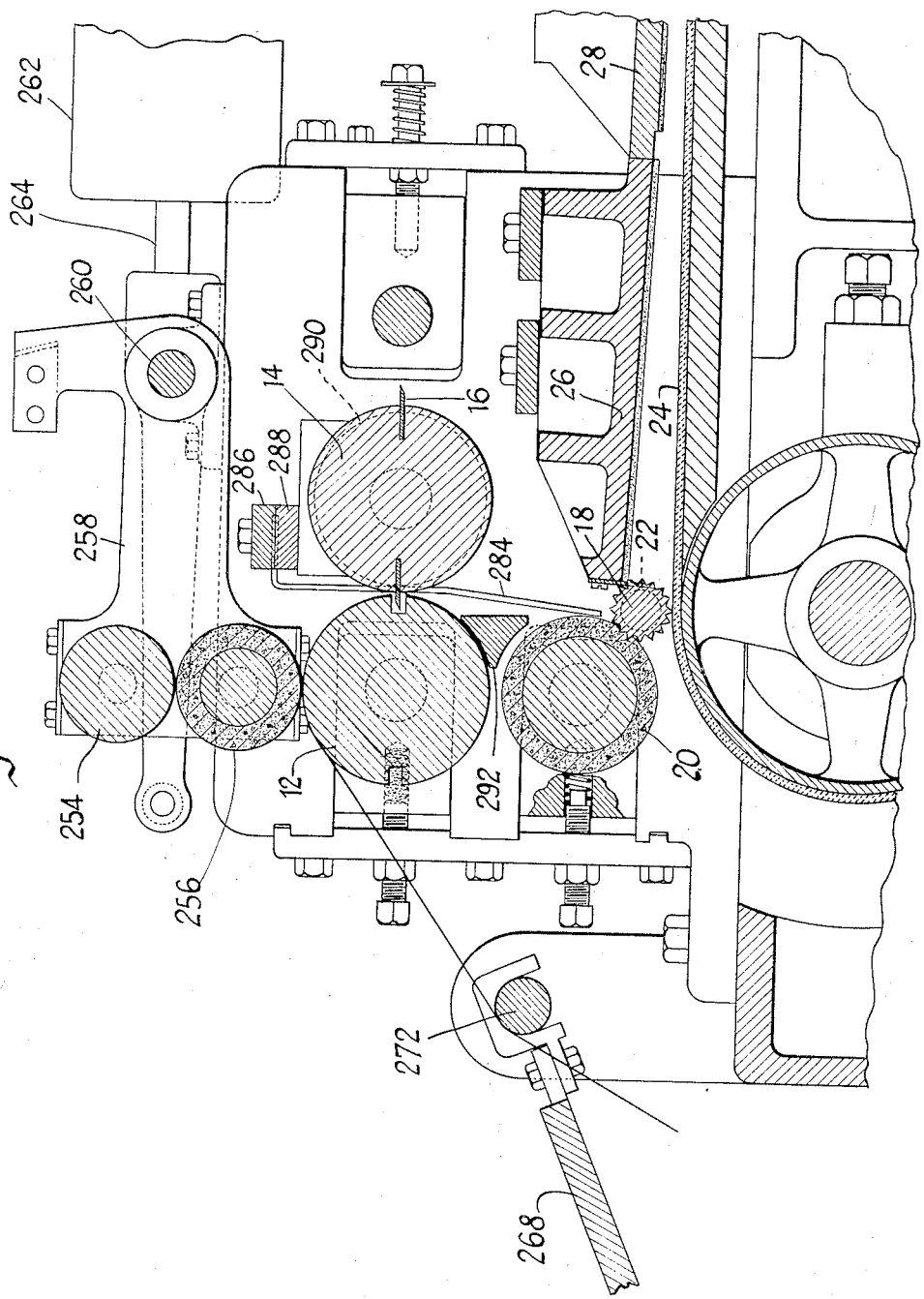
Fig. 4 is a vertical section through the roll stand, showing the strip cutter and the convoluter.

The illustrative machine supports a paper supply roll 10 (Fig. 1) from which a constantly unwinding strip passes downwardly between the continuously rotating strip cutter rollers 12 and 14, as indicated in Figs. 3 and 4. The teeth 16 of the roller 14 sever the supply strip into rod strips which then pass between the crimper roller 18 and the associated rubber faced roller 20 to initiate the convoluting of the rod strips.

The crimped strips are stripped from the roller by the action of the stripper teeth 22 and the continuously moving belt 24. The latter then cooperates with the convoluter plate 26 and the compactor plate 28 to cause the development of the paper rods, indicated in the successive stages W-X, inclusive, in Fig. 3.

When they reach the stage X the rods are well compacted and bonded but they may have been so acted upon that some of them are oblique to the normal to their intended path of movement. The rods may also be slightly bowed by reason of a lack of uniform compacting pressure throughout their lengths. Both of these conditions are undesirable for several reasons, one of which is their effect upon the proper operation of the rod cutter disposed in the zone H (see Fig. 3). This cutter severs the long rods transversely so that the resulting components are the finished products, except for drying which is necessary because of the moistening by a bonding fluid carried on the surface of the belt 24. This moisture is effective upon the sized paper to promote the bonding of the exterior convolutions of the finished rods.

The rod cutter includes a plurality of knives 30—33 set parallel to the path of movement of the rods and spaced apart a distance equal to the length of the desired final product. This arrangement of the knives is indicated in Figures 5, 8, 15 and 16 of the drawings, Fig. 8 also indicating the extent to which the knives extend into the compacting and cutting passageway 40.

Figure 5:
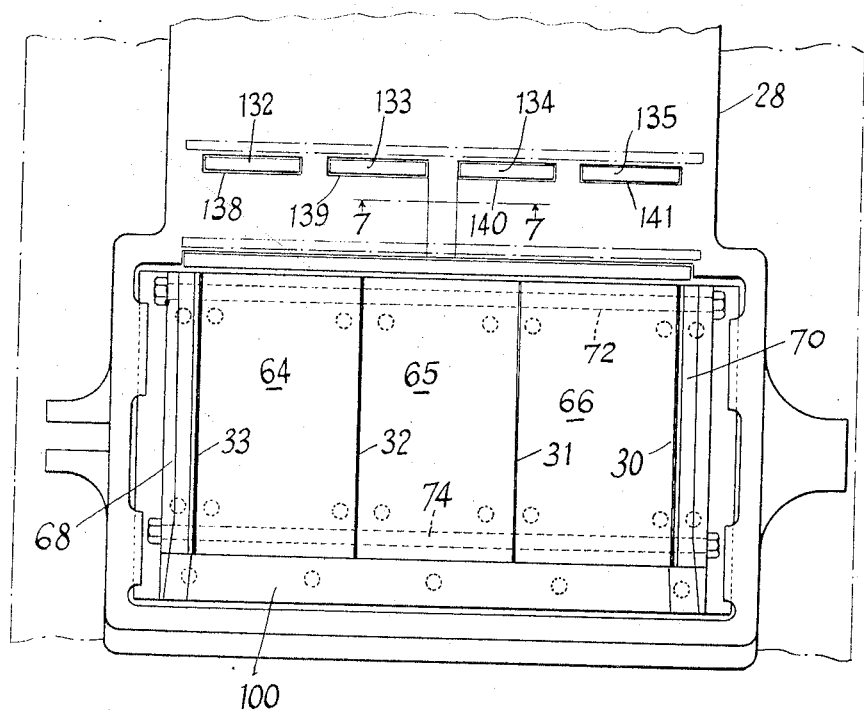
Fig. 5 is a bottom plan of the rod cutter, near the discharge end of the machine.
Figure 6:
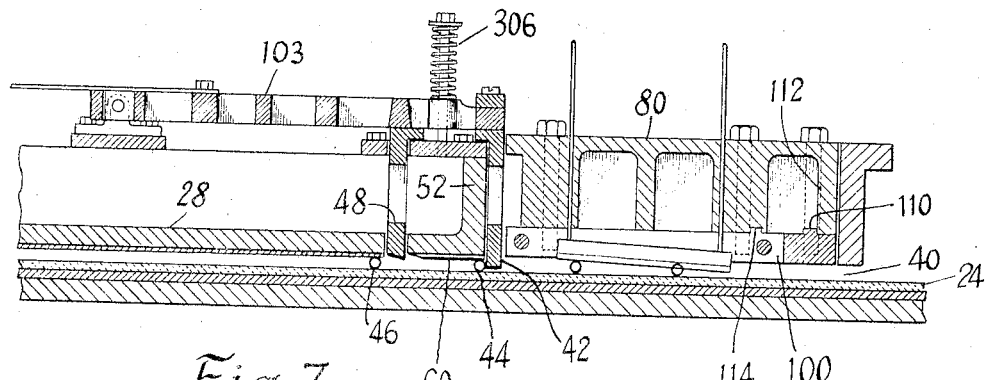
Fig. 6 is a vertical section of the rod cutter and the associated rod aligner.
Figure 15:
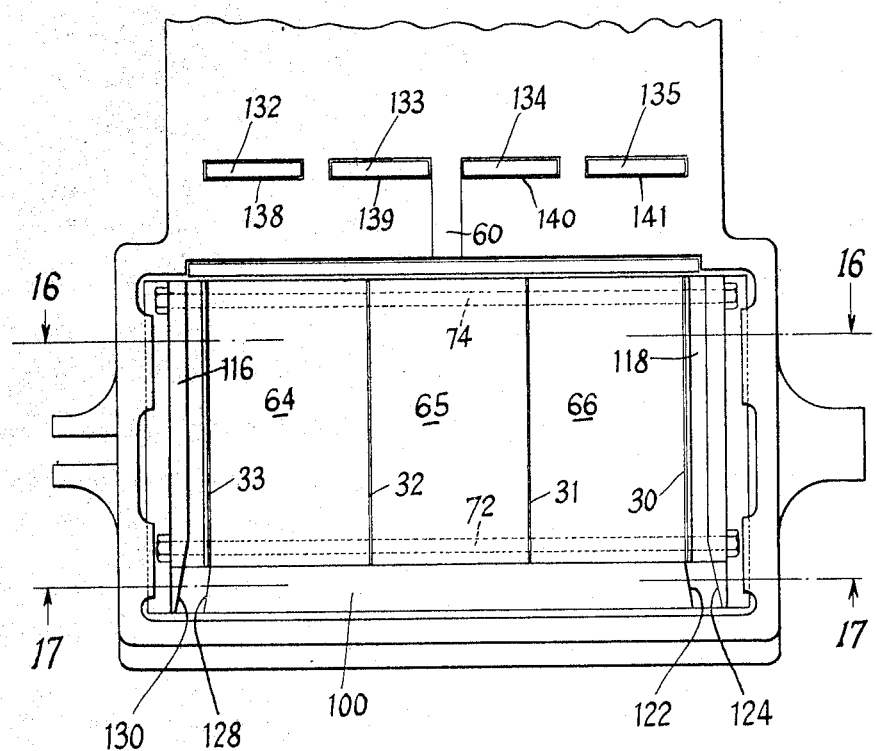
Fig. 15 is a bottom plan of the rod cutter, illustrating the pressure relieving channels alongside the outer knives.

The long rods, or master rods, move toward the right (in Figs. 3 and 6) under the cutting edges of the knives and, due to inclination of the knives, the rods are severed with a rolling cutting action which produces smooth and clean cut end surfaces of the finished products. These surfaces are also formed exactly normal to the longitudinal axes of the rods by reason of the rod straightening and aligning mechanism shown in Figs. 3 and 6, just ahead of the rod cutter. This mechanism includes the vertically movable straight-edge, or stop 42, which is contacted by an oncoming rod 44, as indicated in Fig. 6. The advance of the rod 44 is thereby stopped long enough for the rod to be straightened against the straight-edge, and then the cam lifting action of a following rod 46 against the sections 132—135 of lift bar 48, raises the straight-edge and permits the rod 44 to be advanced by the belt 24 to the rod cutter. The sections or extensions 132—135 of the lift bar 48 operate through openings 138—141 in presser plate 28, as shown in Figs. 5 and 15. The rod 46 is rolled past the sections of the bar 48 to allow the latter and the stop 42 to return to their down positions to repeat the cycle with the immediately following rod.

Between the sections of lift bar 48 and the stop 42 the straightening of the rods (such as 44 and 46) is promoted by a reduction of the compacting pressure occasioned by an increase in the depth (or width) of the compacting passageway. This is particularly shown in Fig. 3, in which the surface 50 of the presser plate element 52 is at a greater elevation than the pressure surface 54 presented by the lining 56 of the presser plate component 58.

Figure 7:
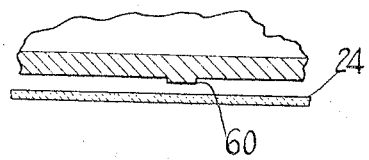
Fig. 7 is a detail view presented as a transverse vertical section on the line 7—7 of Fig. 5.

This reduction of pressure upon the rods is effective throughout the major portions of their lengths, but sufficient pressure is maintained upon the mid-portions of the rods to insure their positive and sequential advance to the stop 42. This is caused by the central and downward projection 60 of the element 52, indicated in Figs. 6 and 7.

The lower surface of the projection 60 need not be as close to the upper surface of the belt 24 as is the lower surface of the presser plate lining 56 but it is important that it be close enough to keep the rods advancing at a substantially uniform rate.

Figure 16:
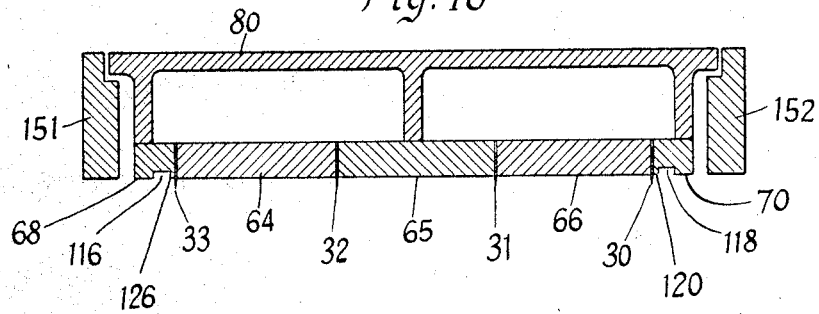
Fig. 16 is a transverse vertical section on the line 16—16 of Fig. 15.

Immediately after the stop 42 is raised the convoluted rod released thereby is advanced by the belt into contact with the forward lower edges of the knife spacer blocks 64—66 and the side blocks 68 and 70 rigid therewith. These elements are held in a rigid assembly by horizontal through bolts 72 and 74 with the knives 30—33 frictionally held between them, as indicated in Figs. 6, 15 and 16.

The spacer blocks 64—66 and the side blocks 68 and 70 are detachably secured to the cutter head casting 80 by the cap screws 81—96 which preferably extend downwardly through holes in the casting and are screw threaded into sockets formed in the top portions of the blocks. The casting 80 is, in turn, supported by the presser plate casting so that the lower surfaces of the blocks contact the advancing rolls and maintain pressure thereon.

The cutter head assembly also includes the aligning block 100 secured to the casting 80 by the cap screws 102—106, as indicated in Figs. 5, 6, 8, and 9, and correct assembly of the pressure face elements of the cutter head is facilitated by the engagement of the aligning block rib 110 with the web 112 of the casting 80. Similarly, the remaining cutter head blocks are interlocked with the casting 80 by the reception of their ribs 114 within grooves formed in the lower face of the casting 80 as clearly indicated in Figs. 3 and 6.

The knives 30—33 are so inclined and positioned that their cutting action progresses gradually through the convoluted paper rods, the rearmost, or deeper, cutting edges of the knives extending approximately halfway across the rod cutting passageway 40. Furthermore, the knives are formed as very thin steel blades for the purpose of reducing their resistance to the rolling advance of the paper rods. The knives must, however, be bevelled to form their cutting edges, and they therefore have somewhat of a wedging effect upon the ends of the partially severed convoluted rods or rod sections. This action has somewhat of a salutary effect in so far as it burnishes or irons the ends of the rods so that they present smooth and continuous end surfaces, but it also has a tendency to cause the rods to become slightly bowed. Furthermore, this wedging action presents increasing resistance to the rolling advance of the rods particularly at positions along the outer knives.

These effects, tendencies, or actions, sometimes cause a piling up of the rods beneath the cutter head and a consequent stoppage of the machine, a contingency which is hastened by the occasional presence of rods of abnormally large diameter.

Figure 17:
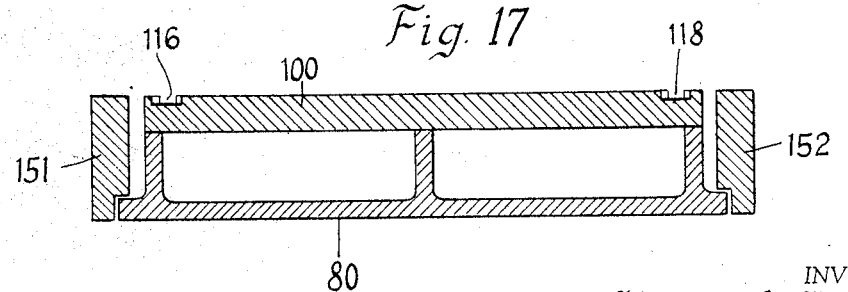
Fig. 17 is a transverse vertical section through the rearward portion of the rod cutter, on the line 17—17 of Fig. 15.
Figure 18:
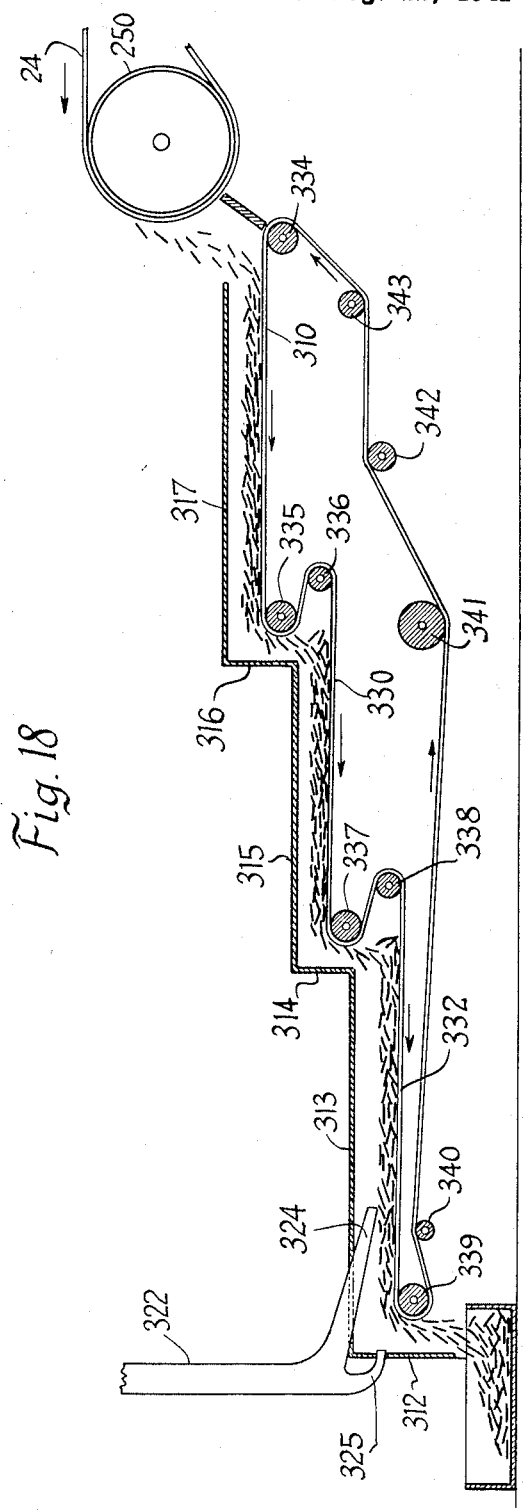
Fig. 18 is a diagrammatic view in the nature of a longitudinal vertical section through a rod drying mechanism to which the moistened rods are delivered directly from the rod cutter.

Such stoppages not only involve loss of production efficiency, but they also cause considerable material loss because the machine must be cleared of all convoluted or partially convoluted rods, before normal production can be resumed. This invention seeks to eliminate such undesirable occurrences, and provides means serving that end. One such means is indicated in Figs. 15, 16 and 17 which disclose the grooves or channels 116 and 118 in the side blocks 68 and 70, respectively. The latter, for instance, is channelled in a direction mainly parallel to the adjacent knife 30, leaving the narrow ridge or shelf 120 immediately adjacent the knife. Beyond the end of this knife the channel is angled outwardly as indicated by the walls 122 and 124, formed by channelling the aligning block 100. There are similarly arranged formations adjacent the other outside knife 33, as indicated by 126, 128, and 130.

The outer knives 30 and 33 cut off small end portions or nubbins from the master rods, and although the cutting resistance offered by these nubbins is small, it has been found in actual operation (of the machine lacking the present improvements) that "jambs" (or such piling up of the rods under the cutter head as will stop the normal operation of the machine) always occur adjacent the outside knife which happens to be cutting off the longer nubbins. The present combination of the channels 116 and 118 with the narrow shelves 120 and 120 decreases and tends to standardize the cutting resistance of the nubbins. It also reduces the frequency at which the "jams" occur by reducing the cutting resistance of the remainders of the master rods, easing the friction against the knives due to the endwise thrusts of the rod sections between the successive knives.

The illustrative channels 116 and 118 also, by reason of their divergent ends, help (as indicated at 122, 124, 128 and 130) to separate the nubbins from convoluted rods formed between the knives. The great majority of the nubbins, taking the path of least resistance, leave the shelves 120 and 126, and move along the channels. They are thus guided toward the outer edges of belt 24 by the oblique rearward ends of the channels.

Figure 9:
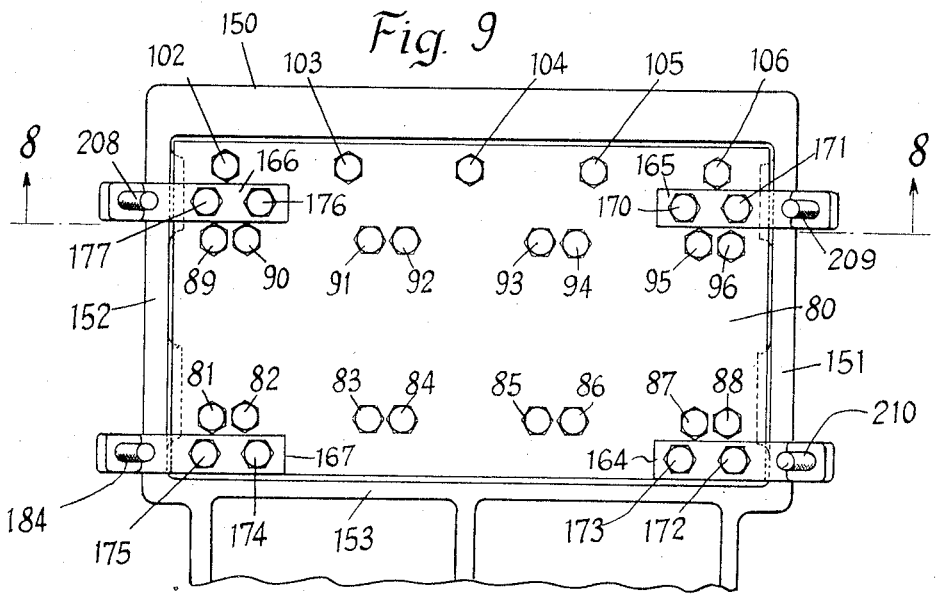
Fig. 9 is a top plan of the rod cutter.
Figure 8:
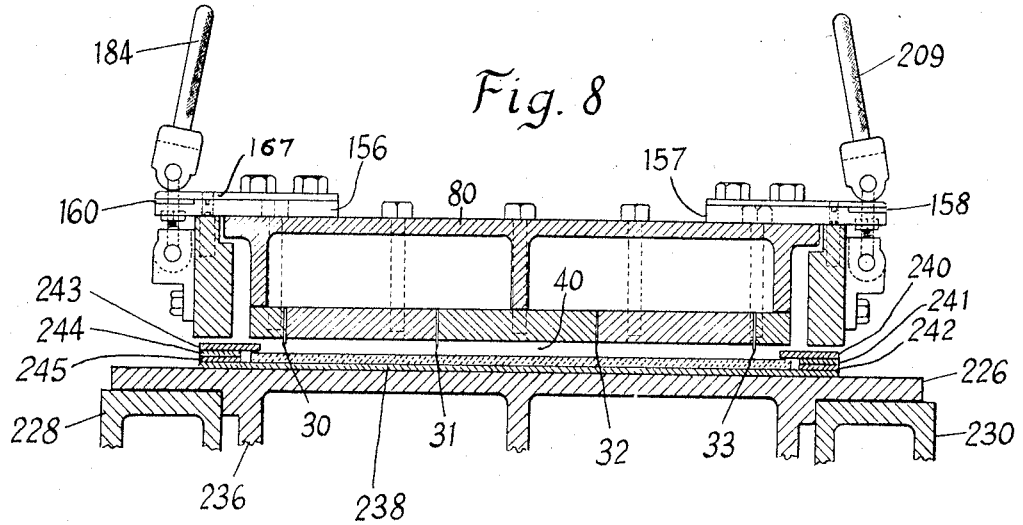
Fig. 8 is a transverse vertical section of the rod cutter, on the line 8—8 of Fig. 9.

Stoppage of the machine due to temporary and abnormal pressures against the cutter head is also prevented by the cutter head mounting indicated in Figs. 8–13. Figs. 8 and 9 show the cutter head mounted within a framed opening at the rear end of the presser plate construction. The frame components 150—153 are preferably parts of the casting which constitutes the main body of this construction.

At the corners of cutter head casting 80 are yieldable lock constructions which limit the downward movement of the cutter and maintain it in operative position while permitting it to yield upwardly to abnormal pressures against its cutting face, such abnormal pressures being resisted by increased downward pressure of the cutter head upon the convoluted rods beneath. The lock mechanisms include the steel bars 156 and 157 recessed as indicated at 158, 160, and 162.

Spring steel plates 164—167 of the same areas as the bars are fixed above the latter and the pairs of bars and plates are rigidly secured to the top of the cutter head by the cap screws 170—177. Each pair extends out over the side frame components 151 and 152, so that the cutter head has its downward movement limited thereby.

The details of the construction of each of the lock mechanisms are identical with the construction indicated in Figs. 10, 11, 12, and 13. It includes a pintle 180 pivotally securing the locking cam 182 and its lever 184 to the aluminum frame component 152. The lever is rigid with the cam, and these elements swing as a unit about the axis of the pintle 186 when the cam is being operatively engaged with, or disengaged from, the top of the spring plate 167. Fig. 10 shows the locking cam disengaged from the plate.

When it is desired to lock the cutter head to the presser plate construction, the cam lever 184 is swung counterclockwise from its Fig. 10 position. Then the entire cam and link unit of the locking mechanism is swung clockwise about the pintle 180 so that the adjusting link block 190 enters recesses 192 and 194 in the elements 156 and 157, and the eccentric surfaces 196 and 198 of the U-shaped cam 182 engage the ends of the spring plate 167. Thereupon, the lever 184 is swung clockwise to cause the cam 182 to press the spring plate teeth 200 and 202 (and through them, the cutter head) downwardly. The extent to which the teeth 200 and 202 are deflected by this action, and therefore the downward pressure upon the cutter head, may be varied or regulated by turning the adjusting screw 204. This element has a left-hand thread engaging the threads in a socket in the upper link block 190, and a right-hand thread on its lower portion engaging interfitting threads in a socket in the lower link block 206. In actual practice the normal downward deflection of the teeth 200 and 202 is slight and additional yield caused by the raising of the cutter head by the convoluted rods is also very slight. The additional yield should not exceed a few thousandths of an inch.

It will be understood that similar actions may take place at each corner of the cutter head, the cam levers 208—210 being swung to engage the top of the spring plates 164, 165, and 166.

The position of the cutter head relative to the upper surface of the belt 24 may be adjusted by precision means associated with each cutter head locking mechanism. As shown in Figs. 10, 11, and 13, this means includes a set screw 212 screw threaded into the bar 156 with its lower end engaging the top of a steel plug 214 threaded into the aluminum frame. The set screw 212 is thus prevented from mutilating the frame and the adjustment of the cutter head is rendered more exact and more reliable.

To prevent the set screw 212 from accidental turning, and to maintain the precision adjustment of the cutter head, the threads of set screw 212 are engaged by a brass plug 216 which is not threaded except on its face contacting the set screw. This plug has an easy fit in the inner end of a lateral bore in the bar 156. The outer part of this bore is of larger diameter, and it is screw-threaded to receive the lateral set screw 218. Preferably the threads on the inner end of the brass plug 216 are formed by forcing the plug against the threads of the tap for the bore of set screw 212 by pressure thereon created by turning the set screw 216, and while the tap is being turned.

Fig. 8 of the drawings illustrates the positions of the cam locking levers when the cutter head is in its operative position with the lower ends of the set screws 212 tightly pressed against the upper ends of the steel plugs 214.

Figure 1:
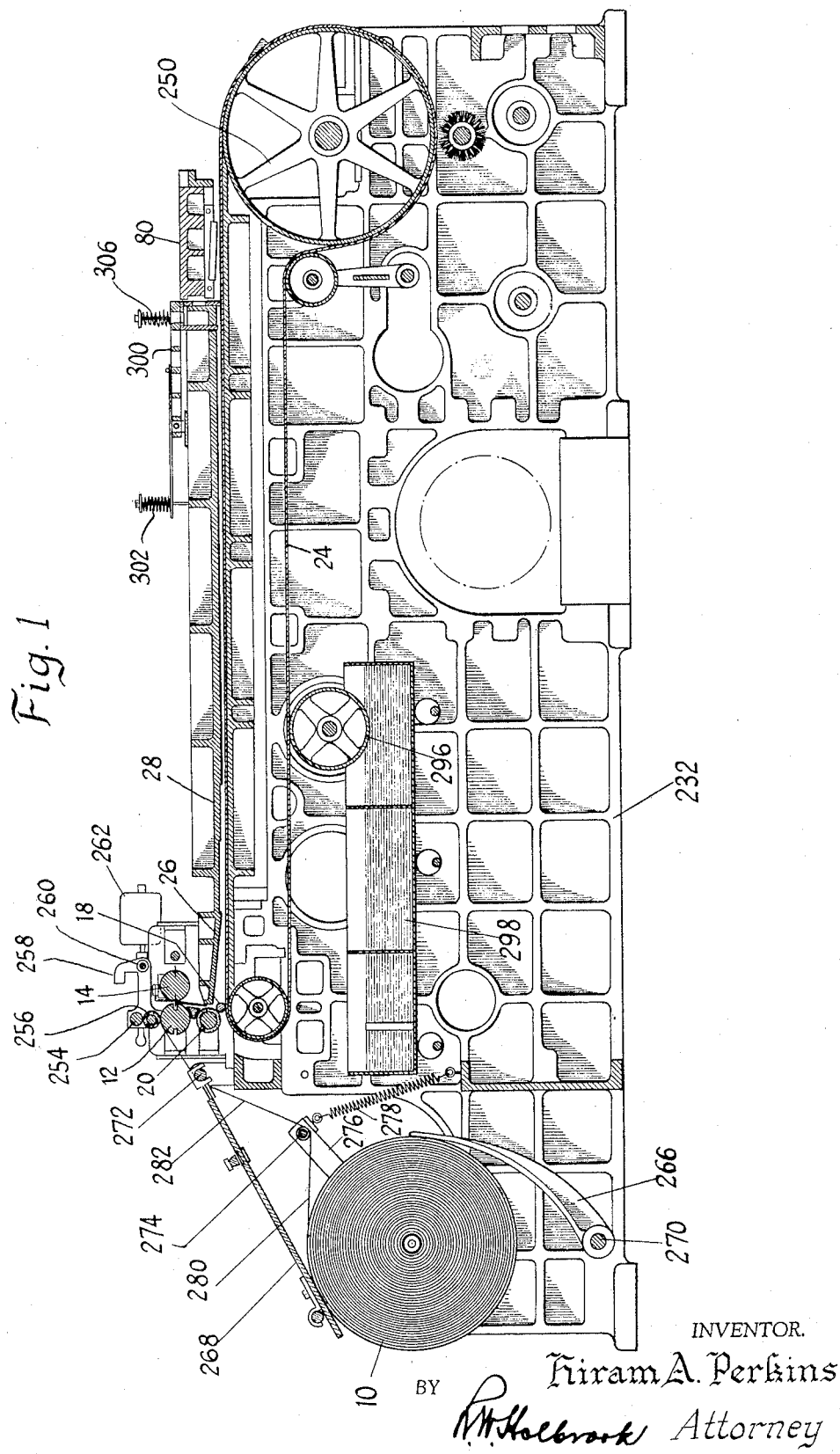
Fig. 1 is a longitudinal vertical section of the illustrative machine.
Figure 2:
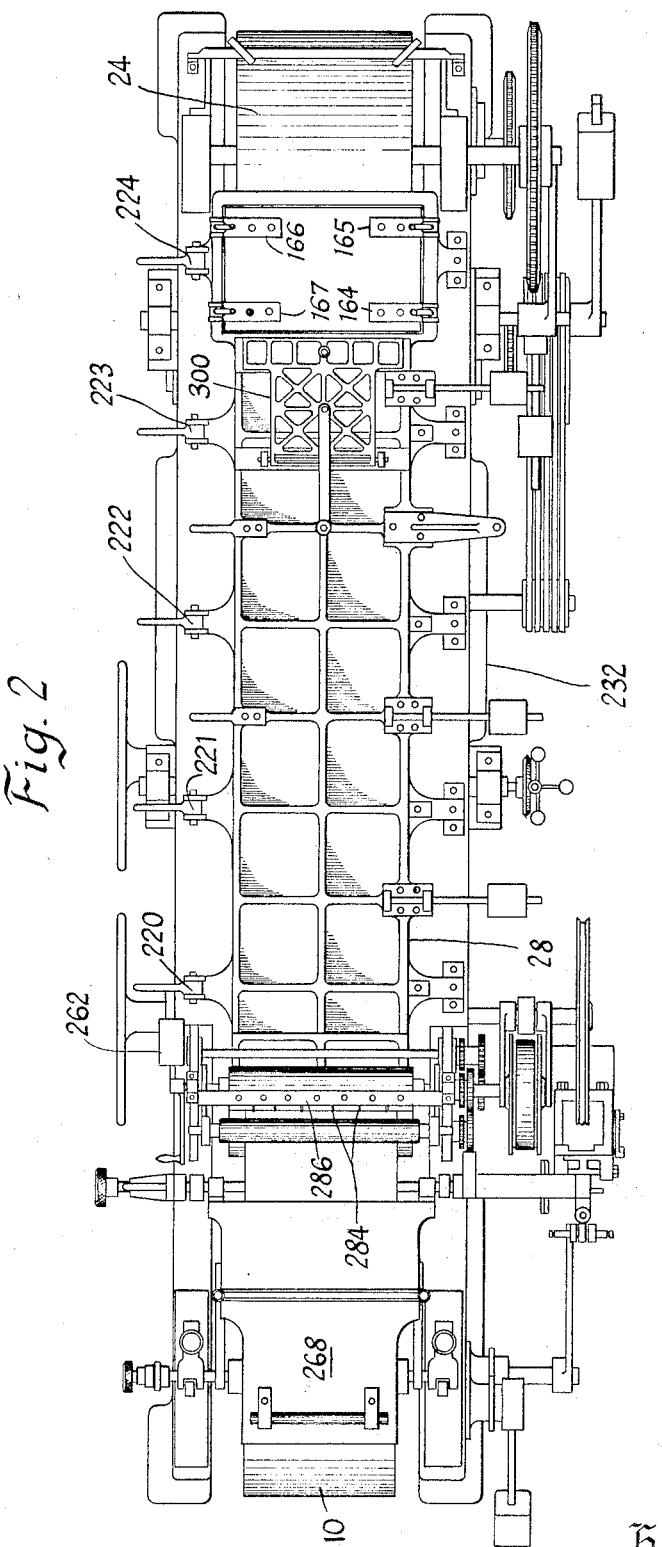
Fig. 2 is a plan.

The presser plate structure is preferably a large aluminum casting extending from the convoluter plate to the discharge end of the machine, as indicated in Figs. 1 and 2 of the drawings. It is preferably pivotally supported at one side of the machine on a horizontal axis so that the compacting and cutting zones may be accessible when the casting is swung upwardly in a manner specifically indicated in my co-pending application 354,945, filed on August 31, 1940 (now Patent 2,357,846, Sept. 12, 1944). In the normal operation of the illustrative machine the entire presser plate structure, including the cutter head, is locked in the desired position by lock-mechanisms 220—224 (Fig. 2) similar to those above described as associated with the cutter head.

The convoluted paper rolls and rods (or candy sticks) are always subject to pressure between the lower surface of the presser plate lining and the lower surface of the cutter head, on the one hand, and the upper surface of the belt 24, on the other hand. The latter is maintained at a fixed level by a heavy bed plate construction, indicated at 226 in Fig. 8. The bed plate structure rests upon heavy side supports 228 and 230 disposed along the tops of the main side frame members, one of which is indicated at 232 in Fig. 1. There are preferably several of such supports along each frame member, for promoting effective operation, adjustment, inspection, and repair of the machine. For example, it may be important at times to have access to a certain part of the interior structure beneath one of the bed plate castings 236, several of which extend across the machine, as indicated in Fig. 8. This may be had by loosening bolts or cap screws holding the castings 236 upon the supports 228, and swinging one of the supports aside. This mode of construction also facilitates the replacement of the belt 24 when it becomes worn.

To provide a smooth support for the upper run of the belt 24, the latter rests upon a unitary plate 238 which extends over the bed plate castings. At the longitudinal margins of the plate 238 there are metallic strips 240—245 fixed to the plate for guiding the belt 24 at its longitudinal margins, as indicated in Fig. 8.

The belt preferably acts to transmit power from the rear pulley 250 to the crimper rolls 18 and 20 and the strip cutter rolls 12 and 14, the latter operating the supply roll through the unwinding paper. With this arrangement, the supply of paper to the machine is automatically stopped whenever the operation of the belt ceases.

The unwinding paper is continuously gripped by the strip cutter rolls but that grip is not relied upon to unwind the paper from the supply roll. Instead, the pull on the paper is mainly produced by reason of the fact that the paper is pressed against the top of the roll 12 by weight of the floating rollers 254 and 256. Their guiding frame 258 is pivotally supported about the axis of the rod or shaft 260.

Over-running of the supply roll 10 is prevented by braking means including the friction members 266 and 268. The former is fixed to a shaft 270 which is appropriately biased to keep the upper end of the member 266 in contact with the supply roll at one position while, at an angularly remote position the member 268 rests upon the supply roll. The latter member is freely pivoted on the rod or shaft 272 mounted at the forward end of the machine as shown in Fig. 1.

The paper passes from the supply roll over the rod 272, and then directly to the cutter roll 12, but, between the rod 272 and the supply roll a predetermined amount of slack, or added length of paper is provided by the roller 274. The latter is journalled in a pivoted frame 276 urged downwardly by the spring 278 to provide the added, or compensatory, paper lengths in the runs 280 and 282. This provision prevents the tearing of the paper due to an accidental increase in the force exerted thereon, and it is of prime importance in starting the machine. At such times the pull on the paper between the cutter rolls and the supply roll would be increased on account of the inertia of the supply roll if some starting force were not applied to the latter. This has been done manually but it is almost impossible to exactly coordinate such action with the motor starting of the belt, crimper, and the cutter rolls 12 and 14. This absence of coordination is taken care of by the roller 274 which keeps the festoon runs 280 and 282 straight and taut.

It is important that the leading edge (or end) of the paper passing downwardly from the zone of contact of the cutter rolls 12 and 14 be guided to the position wherein it is gripped between the crimper rolls 18 and 20 and this is accomplished by the rods 284 shown in Figs. 4 and 14. They are supported at their upper ends by the fixed bars 286 and 288 at a position above the roll 14 and they extend downwardly between the rolls 12 and 14 to a position adjacent the zone of contact of the crimper rolls 18 and 20. This is permitted by the provision of circumferential grooves 290 in the roller 14, each rod or wire 284 being received in one of the grooves. This arrangement of elements also prevents the paper from winding up on the roll 14 and thereby interfering with the normal, and effective operation of the machine.

Below the strip cutter rolls 12 and 14 the lower portions of the rods 284 form one side of a passage or guideway 294 for the paper while the vertical face of the fixed guide-block 292 forms the other side of the passage.

After the severed paper strips are pulled through the passage 294 by the crimper rolls, the convoluting action of the strips begins, and the combined convoluting and compacting continues through the zones of action C, D and E, as shown in Fig. 3. The convoluting passage terminating at the entrance of zone C tapers toward that zone and causes the convoluted roll to assume the ovate shape shown at stage N. It is undesirable that the roll continue to have such shape for more than one reason, and means are provided for permitting the ovate rolls to assume circular form at the entrance to zone C. As shown, the convoluting and compacting passage of this zone at this point is larger (wider, or deeper) than the exit of the convoluting zone, to allow the roll to assume the circular cross section indicated at stage O.

A similar relationship of parts exists also at the entrances of zones D and E, and the ovate rolls therefore reassume their circular cross-section at these positions.

In the zone F the rolls are compacted and bonded by reason of the continued compacting and bonding pressure and the consequent exuding from the belt 24 of the moisture imparted to the belt by the moistening action of the roller 296 (see Fig. 1) which passes through the fluid in the tank 298.

The previously described straightening and aligning of the paper rolls takes place in the zone G where the members 42 and 48 are mounted upon the pivoted rod aligner frame 300, the action of which is desirably modified by the action and adjustment of the compression springs 302 and 306.

The zone H is the zone of action of the rod cutter, the paper rods being cut to length and their ends smoothed and glazed by an ironing or burnishing action.

Beyond the zone H the compacted paper rolls or rods drop from the belt 24 as it passes around the rear pulley 250. They drop on to the highest run 310 of a single dryer belt which preferably operates at a speed much less than that of the belt 24. The paper rods consequently pile up in a promiscuous manner which promotes effective contact of the heated air (or other gas) delivered to the housing by the conduits or jets 324 and 325. The housing substantially encloses the piled up paper rods on all of the operative runs of the drying conveyor, causing the heated air to pass over the rods and exit at a position adjacent the discharge end of the belt 24.

At the end of the run 310 the paper rods drop onto a lower run 330, this action exposing new surfaces to drying action and thus promoting uniformity and completeness of drying. This prevents warping of the rods which would be caused by uneven drying.

Similar action takes place as the rods again pile up on the run 332 after dropping from the end of the preceding run.

The dryer belt is guided by the rollers or pulleys 334—343 to form the runs 310, 330 and 332, and the re-entrant zones at the discharge ends of those runs. One or more of these pulleys may be driven by any appropriate source of power other than which drives the previously described mechanism, the important considerations being that the speed of the dryer belt be much less than that of the belt 24, and that the dryer continue to operate even though the delivery of the paper rods thereto may be temporarily discontinued.

The illustrative dryer is effective in operation and it effects material savings in space, installation costs, and operating costs, over other drying mechanisms. For example, a 20 ft. travel of the paper rods on the illustrative dryer with the 3 described drops has a drying effect much superior to that of a dryer causing a 100 ft. travel of the rods, without the drops. Furthermore, it will produce this result in much less time, and at materially reduced air and heat requirements.

Although, in compliance with section 4888 of the Revised Statutes, the invention has been described with reference to the details of construction and operation of the particular machine illustrated in the drawings, it is to be appreciated that the invention is not to be considered as limited to those details. It is rather to be considered to be of a scope indicated by the subjoined claims.

I claim as my invention:

1. In a machine of the class described, means forming a passageway in which compressible tubes are compacted into substantially solid rods as they advance by rolling through the passageway, a part of said means including a carrier, a normally spring held cutter head forming with the relatively unyielding carrier at least a substantial part of the passageway the cutter head and the carrier forming opposed passageway surfaces in pressure contact with the rods throughout their effective lengths, knives carried by the cutter head and extending into the passageway to an extent substantially equal to the radius of one of the rods so that the rods are cut by rolling against and along the knives, and means operative within narrow limits for yieldingly pressing the cutter head and the knives toward the relatively unyielding surface of the carrier, said last named means operating to increase the pressure upon the rods when their resistance to the cutting action causes the cutter head to temporarily move away from the carrier.

2. In a machine of the class described, means forming a passageway in which compressible tubes are compacted into substantially solid rods as they advance by rolling through the passageway, a plurality of normally spring held cutting elements extending into the path of said rods and projecting into said passageway substantially to the centers of the rods, a carrier rolling said rods along said cutting elements while pressure on the rods is maintained, a yielding cutter head including said elements, the cutter head and the carrier forming opposed passageway surfaces in pressure contact with the rods throughout their effective lengths, and spring means increasing the pressure of the cutter head against the rods when the operative actions between the knives create resistance to the advance of the rolls sufficient to move the cutter head against said spring means (last named).

3. In a machine of the class described, means forming a passageway in which compressible tubes are compacted into substantially solid rods as they advance by rolling through the passageway, means presenting opposite roll contacting and passageway forming surface units at least one of which is normally in substantially uniform motion in a fixed path, the surfaces of said units being in pressure contact with the advancing rods throughout their effective lengths, one of said units including a rod cutter head normally spaced from said moving surface unit to form therewith at least a part of said passageway, the head having spaced cutters projecting into the passageway to the centers of said rods, means maintaining said surface units in passageway forming relationship, and a spring mounting normally holding the cutter head pressed against rods rolling along the moving unit but increasing that pressure when the head yields to permit the passage therealong of rods of abnormally large diameter, the cutter head being movable toward or away from said fixed path unit.

4. In a machine of the class described, a passageway forming means including a fixed presser plate and an endless belt, means holding the belt in a predetermined spaced relationship to the plate to form a roll passageway in which rolls or rods are rollingly advanced, a belt operator, and a rod cutter head positioned beyond the plate and in such spaced relationship to the belt as to form a substantial continuation of said passageway the cutter head and the belt forming opposed passageway surfaces in pressure contact with the advancing rods throughout their effective lengths, the cutter head being also constantly pressed toward the belt by pressure means which increases that pressure when rods of abnormal diameter roll along the head.

5. In a rod cutter, a carrier causing spaced rods to be rolled along a passageway, a knife block fixed against movement with the carrier and presenting a pressure surface constituting one wall of said passageway, the carrier and said surface of the knife block maintaining pressure contact on the rods throughout their effective lengths, a plurality of spaced knives secured to the knife block in such positions that they extend into the passageway and transversely of rods rolled along the knife block by the carrier, and means constantly pressing the knife block toward the carrier but permitting the block to move slightly in a direction away from the carrier when abnormal resistance arises from the rolling of the rods over the cutting edges of the knives, the pressure surface face of the knife block externally of the outside knives being formed with grooves or channels slightly spaced from those knives and extending therealong to relieve abnormal resistance to rod travel occasioned by the rod cutting action of the apparatus.

6. In a machine of the class described, a presser plate structure, a conveyor one run of which is closely spaced from said structure to form a passage in which rods are advanced by rolling, a cutter head combining with said run to form a substantial continuation of the passageway the cutter head and the conveyor forming opposed passageway surfaces in pressure contact with the rods throughout their effective lengths, and rod cutting knives carried by the cutter head and disposed so as to present inclined cutting edges in said continuation, the surface of the cutter head exteriorly of the outer knives and facing the carrier being formed with grooves extending alongside the knives.

7. In a rod cutter, a cutter head having a plurality of inclined knives presenting cutting edges projecting from the adjoining and intervening surfaces of the cutter head, and means for rolling cylindrical elements along said surface and the cutting edges to sever the elements into components of predetermined length, the surface of the cutter head exteriorly of and alongside the outer knives being set back from said means further than the intervening surfaces to reduce the rolling pressure upon the ends of said elements and to reduce the resistance of said elements to the rolling cutting action.

8. In a candy stick producing machine, means normally acting upon paper strips to initiate their convolution, means including a carrier to continue the convolution of the strips into loosely wound rolls, reaction means cooperating with the carrier to further convolute the paper rolls in a compacting passageway until they become substantially solid rods, a yielding cutter head including inclined knives extending into and half way across the compacting passageway, and means for maintaining the knives against movement in the direction of advance of the rods while permitting the knives and the cutter head to yield away from the cooperating surface of the carrier when abnormal resistance occurs along the compacting face of the cutter head.

HIRAM A. PERKINS.